United States Patent
Xue et al.

(10) Patent No.: US 12,219,078 B2
(45) Date of Patent: Feb. 4, 2025

(54) ELECTRONIC DEVICE

(71) Applicant: Honor Device Co., Ltd., Shenzhen (CN)

(72) Inventors: Kangle Xue, Shenzhen (CN); Jiuliang Gao, Shenzhen (CN); Yan Wang, Shenzhen (CN); Yihe Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/915,044

(22) PCT Filed: Jan. 19, 2022

(86) PCT No.: PCT/CN2022/072727
§ 371 (c)(1),
(2) Date: Sep. 27, 2022

(87) PCT Pub. No.: WO2023/019881
PCT Pub. Date: Feb. 23, 2023

(65) Prior Publication Data
US 2024/0236221 A1    Jul. 11, 2024

(30) Foreign Application Priority Data

Aug. 18, 2021 (CN) .......................... 202121946038.X

(51) Int. Cl.
*H04M 1/02* (2006.01)
*H04M 1/22* (2006.01)

(52) U.S. Cl.
CPC ............. *H04M 1/026* (2013.01); *H04M 1/22* (2013.01)

(58) Field of Classification Search
CPC ...... H04M 1/0283; H04M 1/026; H04M 1/22; H04M 2250/52; H04M 1/0264; H04N 23/57

See application file for complete search history.

(56) References Cited

U.S. PATENT DOCUMENTS 8,031,174 B2 * 10/2011 Hamblin ................. G06F 3/042
345/169
9,720,442 B2 * 8/2017 Mongan ................. G02B 27/00
(Continued)

FOREIGN PATENT DOCUMENTS

CN      108632510 A     10/2018
CN      109870751 A     6/2019
(Continued)

*Primary Examiner* — Lewis G West
(74) *Attorney, Agent, or Firm* — Slater Matsil, LLP

(57) ABSTRACT

An electronic device includes a housing, a first functional device, a second functional device, and a light transmissive portion. A mounting hole is provided on the housing. The first functional device and the second functional device are both located inside the housing. The light transmissive portion includes a light transmissive plate, a first shading member, and a second shading member, is mounted in the mounting hole, and is connected to the housing. The first shading member is arranged opposite to the second functional device in a second direction. The first shading member is configured to block visible light and transmit preset light. The second shading member is located on the inner surface of the light transmissive plate, surrounds the first shading member, and is configured to block visible light.

20 Claims, 5 Drawing Sheets

(56) References Cited

U.S. PATENT DOCUMENTS

| | | | |
|---|---|---|---|
| 9,736,283 B2* | 8/2017 | Pope | H04M 1/0264 |
| 11,333,952 B2* | 5/2022 | Qiu | H04N 23/57 |
| 2003/0189557 A1* | 10/2003 | Takagi | H04M 1/0266 |
| | | | 345/204 |
| 2011/0315579 A1* | 12/2011 | Mase | H04M 1/04 |
| | | | 206/316.2 |
| 2013/0048837 A1 | 2/2013 | Pope et al. | |
| 2016/0182116 A1* | 6/2016 | Mase | H04M 1/04 |
| | | | 455/575.8 |
| 2017/0198883 A1* | 7/2017 | Huang | H01R 24/28 |
| 2018/0158858 A1 | 6/2018 | Moriya et al. | |
| 2019/0170915 A1* | 6/2019 | Ding | G02B 5/003 |
| 2019/0243417 A1* | 8/2019 | Cheng | G06F 1/1605 |
| 2019/0379779 A1* | 12/2019 | Zhang | H04M 1/72454 |
| 2020/0213492 A1* | 7/2020 | Yang | H04M 1/0264 |
| 2020/0304617 A1* | 9/2020 | Zhang | G06F 3/042 |
| 2021/0074780 A1* | 3/2021 | Woo | H10K 50/84 |
| 2021/0352198 A1* | 11/2021 | Tang | H04N 23/50 |
| 2023/0221601 A1* | 7/2023 | Aoki | G03B 9/02 |
| | | | 349/2 |
| 2024/0056670 A1* | 2/2024 | Liu | H04N 23/57 |
| 2024/0205318 A1* | 6/2024 | Tian | H01M 50/247 |
| 2024/0236221 A1* | 7/2024 | Xue | H04M 1/026 |
| 2024/0300225 A1* | 9/2024 | Gao | B32B 17/04 |
| 2024/0309220 A1* | 9/2024 | Miyake | C09D 7/61 |

FOREIGN PATENT DOCUMENTS

| | | | | |
|---|---|---|---|---|
| CN | 209787288 U | 12/2019 | | |
| CN | 112702453 A | 4/2021 | | |
| EP | 3330781 A1 * | 6/2018 | | G02B 6/0086 |
| EP | 3813342 A1 * | 4/2021 | | G01J 1/0204 |

* cited by examiner

ELECTRONIC DEVICE

CROSS-REFERENCE TO RELATED APPLICATIONS

This application is a National Stage of International Application No. PCT/CN2022/072727, filed on Jan. 19, 2022, which claims priority to Chinese Patent Application No. 202121946038.X, filed on Aug. 18, 2021. Both of the aforementioned applications are hereby incorporated by reference in their entireties.

TECHNICAL FIELD

This application relates to the technical field of electronics, and in particular, to an electronic device.

BACKGROUND

As functions in an electronic device are becoming rich and diverse, increasing types and numbers of functional devices are required to be arranged in the electronic device. The numerous functional devices occupy an excessive space in the electronic device, increasing a thickness of the electronic device. This is detrimental to thinning of electronic devices.

SUMMARY

Embodiments of this application provide a channel measurement method and device, to improve accuracy of channel measurement without increasing air interface resources.

An embodiment of this application provides an electronic device. The electronic device has a small thickness, thereby realizing thinning of the electronic device.

The electronic device includes a housing, a first functional device, a second functional device, and a light transmissive portion. A mounting hole is provided on the housing. The first functional device is located on inside the housing. The second functional device is located inside the housing and arranged side by side with the first functional device in a first direction. The light transmissive portion includes a light transmissive plate, a first shading member, and a second shading member, is mounted in the mounting hole, and is connected to the housing. The first shading member is located on an inner surface of the light transmissive plate, is arranged opposite to the second functional device in a second direction, and is configured to block visible light and transmit preset light. The second shading member is located on the inner surface of the light transmissive plate, surrounds the first shading member, and is configured to block visible light. The first direction is perpendicular to the second direction.

In an implementation, the preset light is light emitted by the second functional device.

In an implementation, the preset light is light entering the second functional device through the first shading member.

The first direction is a length direction or a width direction of the electronic device, and the second direction is a thickness direction of the electronic device. In this embodiment, by arranging the second functional device and the first functional device side by side in the first direction, a space occupied in the electronic device can be reduced. Therefore, a size of the electronic device in the second direction is reduced, that is, a thickness of the electronic device is reduced, thereby facilitating thinning of the electronic device. In addition, since the first shading member can transmit the light emitted by the second functional device and block visible light, the second functional device can perform optical functions thereof. In addition, since the first shading member can block visible light, a user cannot see a structure inside the electronic device through the first shading member. Moreover, since the second shading member can block visible light, a user cannot see the structure inside the electronic device with naked eyes through the second shading member from an outer side of the electronic device. Therefore, the electronic device looks more aesthetically pleasant.

In an implementation, a difference between a visible light transmittance of the first shading member and a visible light transmittance of the second shading member is between 0 and 15%. The second shading member being configured to block visible light means that the second shading member is black or nearly black when viewed by naked eyes. When the difference between the visible light transmittance of the first shading member and the visible light transmittance of the second shading member is greater than 0 and less than or equal to 15%, colors of the first shading member and the second shading member are the same or similar. That is to say, the first shading member is black or nearly black. In this embodiment, the first shading member and the second shading member are both black or nearly black when viewed by naked eyes, thereby ensuring consistency of an appearance of the electronic device.

In an implementation, the second shading member is a black shading layer, the first shading member is an ink layer, and the second shading member includes a hollowed-out area opposite to the second functional device in the second direction, where an orthographic projection of the first shading member in the second direction coincides with an orthographic projection of the hollowed-out area in the second direction.

The black shading layer may be a black ink layer or a black plastic member. In this embodiment, the second shading member which is a black ink layer or a black plastic member can absorb all light. In this way, the second shading member is black when viewed by naked eyes. Since the second shading member provides a blocking effect, a user cannot see the structure inside the electronic device through the second shading member from the outer side of the electronic device. Therefore, the electronic device looks more aesthetically pleasant. In addition, by arranging the first shading member in the hollowed-out area of the second shading member, the light emitted by the second functional device can pass through the first shading member to exit to outside of the housing, thereby ensuring that the second functional device can perform the optical functions thereof.

In an implementation, the black shading layer is a black ink layer, the first shading member and the second shading member are both coated on the inner surface of the light transmissive plate, and the second shading member surrounds the first shading member and is connected to a periphery of the first shading member. In this embodiment, the first shading member and the second shading member are both ink, and are both formed on the inner surface of the light transmissive plate by a silk screen printing process. In this way, a manufacturing process of the first shading member and the second shading member can be simplified.

In an implementation, the black shading layer is a black plastic member, the hollowed-out area runs through the black plastic member, the second shading member is fixed to the inner surface of the light transmissive plate, and the first shading member is formed in the hollowed-out area.

In an implementation, the black shading layer is a black plastic member, the hollowed-out area runs through the black plastic member, the first shading member is arranged on the inner surface of the light transmissive plate, an adhesive layer is arranged around the inner surface of the first shading member, the second shading member is stacked on the adhesive layer and fixed to the inner surface by the adhesive layer, and the first shading member and the hollowed-out area are arranged opposite to each other in the second direction. In this embodiment, the second shading member which is a plastic member provides carrying and supporting effects, so that strength of the light transmissive portion can be increased.

In an implementation, the second functional device is an infrared light device, and the first shading member is infrared transmissive ink and is configured to transmit infrared light.

In this embodiment, since the infrared transmissive ink can transmit infrared light, infrared light emitted by the second functional device which is an infrared light device can pass through the first shading member and the light transmissive plate to exit to the outside of the electronic device. In this way, the infrared light device can perform optical functions thereof. In addition, since the infrared transmissive ink can absorb visible light, the first shading member is black when viewed by naked eyes, and therefore a user cannot see the structure inside the electronic device through the first shading member from the outer side of the electronic device. Therefore, the electronic device looks more aesthetically pleasant.

In an implementation, the second functional device is a proximity light device, the first shading member is a nearly-black ink layer, and the first shading member is configured to transmit a part of light emitted by the proximity light device. The nearly-black ink is ink that can transmit a small amount of light and is nearly black when viewed by naked eyes.

In this embodiment, a transmittance of the nearly-black ink layer is greater than 0 and less than or equal to 15%. The first shading member which is a nearly-black ink layer can transmit a part of the light emitted by the proximity light device, thereby ensuring that the proximity light device can perform optical functions thereof. In addition, since the first shading member is black or nearly black when viewed by naked eyes, a user cannot see the structure inside the electronic device through the first shading member from the outer side of the electronic device. Therefore, the electronic device looks more aesthetically pleasant. The expression "nearly black" herein means a slight color difference with black which cannot be discerned by naked eyes.

In an implementation, a first hole is provided on the second shading member, where the first hole is opposite to the first functional device in the second direction. In this embodiment, the first hole is a hole visible to naked eyes, and the first shading member is a hole that is invisible to naked eyes but can transmit preset light. By arranging the first shading member, it can be ensured that the second functional device can realize functions thereof. A position of the first hole may be designed according to actual requirements, to ensure an aesthetically pleasant and symmetrical appearance of the electronic device.

In an implementation, a second hole is further provided on the second shading member, where the first hole, the second hole, and the hollowed-out area are arranged in sequence along the first direction, and the first hole and the second hole are symmetrical along an axis of the second shading member. In this embodiment, by designing the first hole and the second hole as a symmetrical structure, the electronic device looks more aesthetically pleasant and symmetrical.

In an implementation, a third hole and a fourth hole are further provided on the second shading member, where any two of the first hole, the second hole, the third hole, or the fourth hole are symmetrical with respect to the axis of the second shading member.

In this embodiment, by arranging, on the second shading member, the first hole, the second hole, the third hole, and the fourth hole that are symmetrical to each other in pairs, the electronic device looks more symmetrical and aesthetically pleasant.

In an implementation, the light transmissive portion includes a decorative member connected to a side of the second shading member facing away from the light transmissive plate, located in the mounting hole, and connected to the housing. In this embodiment, the decorative member provides a decorative effect, so that the electronic device looks more aesthetically pleasant. In addition, the decorative member has a certain strength, and therefore can carry the first shading member, the second shading member, and the light transmissive plate.

In an implementation, the light transmissive plate is located in the mounting hole, and a peripheral side surface of the light transmissive plate is connected to the housing. In this embodiment, since the light transmissive plate is directly connected to the housing, so that the thickness of the electronic device can be further reduced. In addition, the light transmissive plate can carry the first shading member and the second shading member.

In an implementation, the second shading member is located in the mounting hole, and a peripheral side surface of the second shading member is connected to the housing. In this embodiment, since the second shading member is a black plastic member, the second shading member provides a shading effect, and therefore a user cannot see the structure inside the electronic device through the second shading member from the outer side of the electronic device. Therefore, the electronic device looks more aesthetically pleasant. In addition, by directly connecting the second shading member to the housing, the structure of the electronic device can be simplified.

In an implementation, the electronic device further includes a lampshade, where the lampshade is located inside the housing and between the first shading member and the second functional device, and a projection of the lampshade on the inner surface of the light transmissive plate covers a projection of the first shading member on the inner surface of the light transmissive plate.

In this embodiment, the lampshade provides a light converging effect, so that the light emitted by the second functional device can be converged to the first shading member and emitted through the first shading member and the light transmissive plate. Therefore, an amount of light of the second functional device exiting through the first shading member is increased. In addition, the lampshade can improve uniformity of the light emitted by the second functional device, so that the light emitted by the second functional device can uniformly exit to the outside of the light transmissive plate.

In an implementation, the electronic device further includes a lampshade, where the lampshade includes a lampshade body and an extension, the lampshade body is located between the first shading member and the second functional device, a projection of the lampshade on the inner surface of the light transmissive plate covers a projection of the first shading member on the inner surface of the light transmissive plate, the extension is located between the first hole and the first functional device, and the extension covers the first hole.

In this embodiment, the lampshade body provides a light converging effect, so that an amount of light of the second functional device exiting through the first shading member is increased. In addition, the lampshade body can improve uniformity of the light emitted by the second functional device, so that the light emitted by the second functional device can uniformly exit to the outside of the light transmissive plate. The extension provides a blocking effect, so that a user can see an appearance of the extension from an outer side of the light transmissive plate through the first hole but cannot see a structure of the first functional device. Therefore, the electronic device looks more aesthetically pleasant.

In conclusion, in this application, by arranging the second functional device and the first functional device side by side in the first direction, a space occupied in the electronic device can be reduced. Therefore, a thickness of the electronic device is reduced, thereby facilitating thinning of the electronic device. Since the first shading member is arranged and the first shading member can transmit the light emitted by the second functional device and block visible light, the second functional device can perform optical functions thereof. In addition, since the first shading member can block visible light, a user cannot see the structure inside the electronic device through the first shading member. Since the second shading member is arranged and the second shading member can block visible light, a user cannot see the structure inside the electronic device with naked eyes through the second shading member from the outer side of the electronic device. Therefore, the electronic device looks more aesthetically pleasant.

DETAILED DESCRIPTION OF ILLUSTRATIVE EMBODIMENTS

Embodiments of this application are described below with reference to the drawings in the embodiments of this application.

This application provides an electronic device. The electronic device includes but is not limited to a cellphone (cellphone), a notebook computer (notebook computer), a tablet computer (tablet personal computer), a laptop computer (laptop computer), a personal digital assistant (personal digital assistant), or a wearable device (wearable device). Description is provided below by using an example in which the electronic device is a cellphone.

Figure 1:
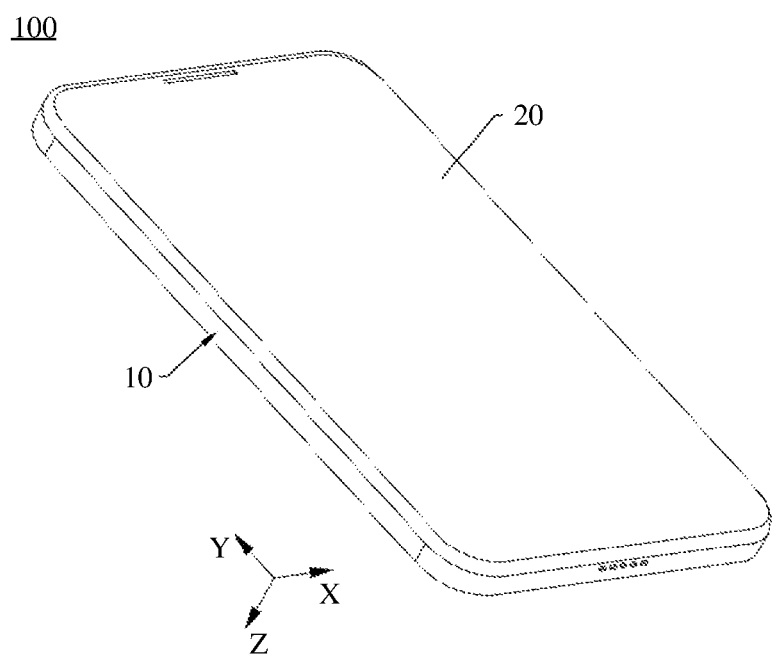
FIG. 1 is a schematic structural diagram of an electronic device according to an embodiment of this application.

Referring to FIG. 1, FIG. 1 is a schematic structural diagram of an electronic device 100 according to an embodiment of this application. The electronic device 100 includes a housing 10 and a display 20. The display 20 is mounted on the housing 10 and exposed relative to the housing 10. The display 20 is configured to display images, videos, and the like. In this embodiment, the display 20 is a flexible display, such as an organic light-emitting diode (organic light-emitting diode, OLED) display, an active-matrix organic light-emitting diode (active-matrix organic light-emitting diode, AMOLED) display, a mini light-emitting diode (mini organic light-emitting diode) display, a micro light-emitting diode (micro organic light-emitting diode) display, a micro organic light-emitting diode (micro organic light-emitting diode) display, or a quantum dot light-emitting diode (quantum dot light emitting diodes, QLED) display. In other embodiments, the display 20 may be a rigid display, such as a liquid crystal display (liquid crystal display, LCD).

For ease of description, in this application, a width direction of the electronic device 100 is defined as a direction X, a length direction of the electronic device 100 is defined as a direction Y, and a thickness direction of the electronic device 100 is defined as a direction Z.

Figure 2:
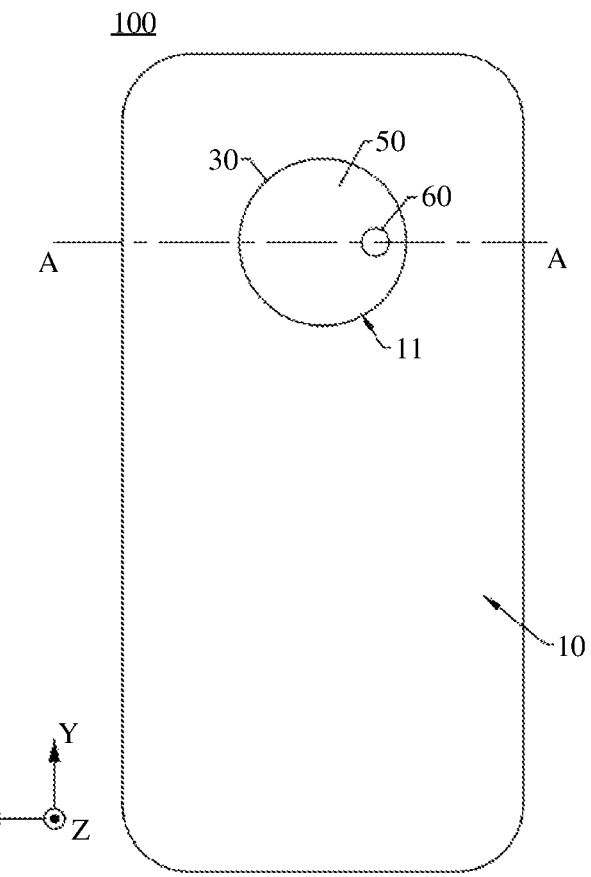
FIG. 2 is a schematic structural diagram of the electronic device shown in FIG. 1 from another angle.

Referring to FIG. 2, FIG. 2 is a schematic structural diagram of the electronic device 100 shown in FIG. 1 from another angle.

A mounting hole 11 is provided on a back side of the housing 10. The electronic device 100 further includes a light transmissive portion 2 (shown in FIG. 3). The light transmissive portion 2 includes a light transmissive plate 30. The light transmissive portion 2 is mounted in the mounting hole 11 and is fixedly connected to the housing 10. In this embodiment, the light transmissive plate 30 is fixedly connected to the housing 10. A shape and a size of the light transmissive plate 30 are the same as those of the mounting hole 11. The mounting hole 11 and the light transmissive plate 30 are both circular. In other embodiments, the light transmissive plate 30 and the mounting hole 11 may be rectangular, square, or hexagonal. The shapes and the sizes of the mounting hole 11 and the light transmissive plate 30 may alternatively be adjusted according to an actual situation. The light transmissive plate 30 protrudes from the housing 10. That is to say, the light transmissive plate 30 protrudes from the housing 10 in the direction Z. Certainly, the light transmissive plate 30 may alternatively be flush with the housing 10. In other embodiments, the light transmissive portion 2 may further include a decorative member fixedly connected to the housing 10. The light transmissive plate 30 is fixedly connected to the decorative member.

Figure 3:
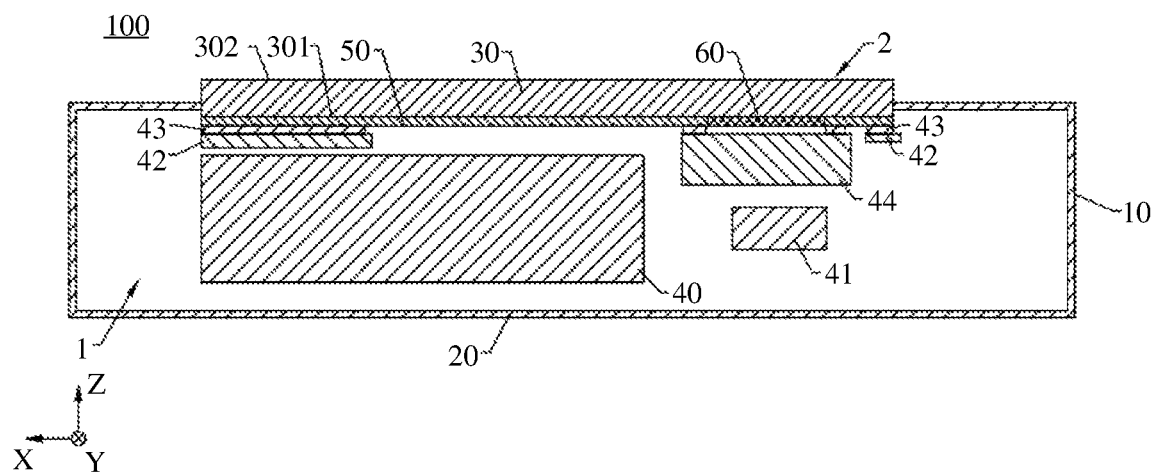
FIG. 3 is a schematic cross-sectional view of the electronic device shown in FIG. 2 cut along A-A.

Referring to FIG. 3, FIG. 3 is a schematic cross-sectional view of the electronic device 100 shown in FIG. 2 cut along A-A. The expression "cut along A-A" means cutting along a plane where A-A is located. The same is true for subsequent diagrams.

The housing 10 and the display 20 together define a receiving space 1. The electronic device 100 further includes a first functional device 40 and a second functional device 41. The first functional device 40 and the second functional device 41 are both located inside the housing 10 (that is, the receiving space 1). The first functional device 40 and the second functional device 41 are both arranged opposite to the light transmissive plate 30. The first functional device 40 and the second functional device 41 are arranged side by side along a first direction. In this embodiment, the first direction is the direction X, and the first functional device 40 and the second functional device 41 are arranged side by side along the direction X. In other embodiments, the first direction may be the direction Y, and the first functional device 40 and the second functional device 41 may be arranged side by side along the direction Y. A specific position of the second functional device 41 may be adjusted according to a spatial layout in the receiving space 1. The first functional device 40 may be a camera module, a sensor, or a circuit component, or may be a structural component such as a screw, a nut, or a positioning post.

The second functional device 41 is an infrared light device or a proximity light device. When the second functional device 41 is an infrared light device, the second functional device 41 can emit infrared light to the outside of the electronic device 100, to assist the camera of the electronic device 100 in imaging during photographing, thereby improving a photographing effect. When the second functional device 41 is a proximity light device, the proximity light device includes a light emitting member and a light receiving member. The light emitting member is configured to emit light, and the light receiving member is configured to receive light. The proximity light device determines a distance from an external object and a working status of the electronic device 100 by calculating moments at which the light emitting member emits light and the light receiving member receives a light signal. When the distance between the external object and the electronic device 100 is less than a preset distance, the display 20 is turned off. When the distance between the object and the electronic device 100 is greater than the preset distance, the display 20 is turned on. It should be noted that, the proximity light device can perform optical functions thereof under the action of only a small amount of light.

In this embodiment, by arranging the second functional device 41 and the first functional device 40 side by side along the first direction, an occupied space is reduced. Therefore, a size of the electronic device 100 in the direction Z is reduced, that is, a thickness of the electronic device 100 is reduced, thereby facilitating thinning of the electronic device 100.

The electronic device 100 further includes a circuit board (not shown). The circuit board is located inside the housing 10 and is electrically connected to the second functional device 41. The circuit board is configured to transmit electrical a signal to the second functional device 41. The circuit board may be a printed circuit board (Printed circuit boards, PCB) or a flexible printed circuit (Flexible Printed Circuit, FPC).

Figure 4:
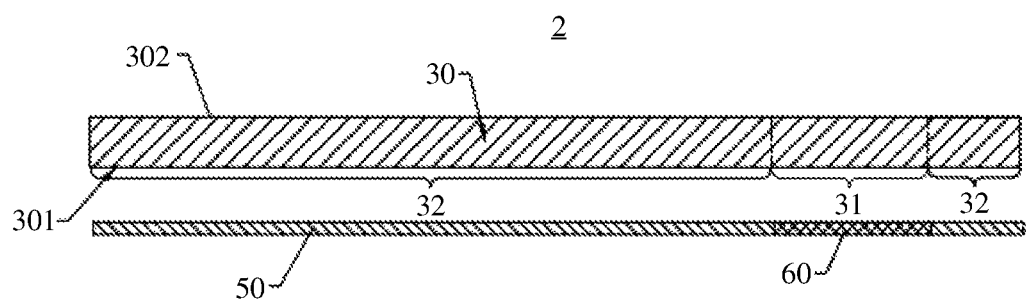
FIG. 4 is a partial schematic structural exploded view of the electronic device shown in FIG. 3.

Referring to FIG. 4, FIG. 4 is a partial schematic structural exploded view of the electronic device shown in FIG. 3.

The light transmissive plate 30 is a transparent glass plate. In other embodiments, the light transmissive plate 30 may be made of other transparent materials, such as an acrylic material. The light transmissive plate 30 includes a first inner surface 301 and a first outer surface 302. The first inner surface 301 and the first outer surface 302 are arranged opposite to each other, and the first inner surface 301 faces the receiving space 1. The first inner surface 301 includes a first area 31 and a second area 32 connected to the first area 31. The second area 32 surrounds the first area 31. In this embodiment, it may be understood that, the first area 31 is circular, and the second area 32 is all other area on the inner surface other than the first area 31. The first area 31 is opposite to the second functional device 41 in the second direction, and the second area 32 is opposite to the first functional device 40 in the second direction. A size and a position of the first area 31 may be adjusted according to the position of the second functional device 41. The second direction is the direction Z.

Referring to FIG. 3 and FIG. 4 together, the electronic device 100 further includes a first shading member 60 and a second shading member 50. In this embodiment, the first shading member 60 and the second shading member 50 are both made of ink, the second shading member 50 is coated on the second area 32, and the first shading member 60 is coated on the first area 31. Specifically, the first shading member 60 is formed on the first area 31 by a silk screen printing process, and the second shading member 50 is formed on the second area 32 by the silk screen printing process.

The first shading member 60 is configured to block visible light and transmit preset light. The first shading member 60 is configured to transmit the light emitted by the second functional device 41, or transmit the preset light. In other embodiments, the first shading member 60 is configured to transmit the light emitted by the second functional device 41, and transmit the preset light outside the housing 10 into the housing 10. That is to say, the light emitted by the second functional device 41 can pass through the first shading member 60 and the light transmissive plate 30 to exit to the outside of the electronic device 100. The external preset light can further pass through the light transmissive plate 30 and the first shading member 60 to enter the second functional device 41. The "preset light" herein may be the light emitted by the second functional device 41, or may be light formed by reflection of the light of the second functional device 41 exiting to the outside of the housing, or may be light having a same wavelength as the light emitted by the second functional device 41.

The second shading member 50 is a black shading layer configured to block visible light, so as to prevent the first functional device 40 from being visible from the outside of the electronic device 100. In this embodiment, the second shading member 50 is a black ink layer. The black ink layer can absorb all light, so that the second shading member 50 is black when viewed by naked eyes. In addition, neither the external ambient light can pass through the second shading member 50 and enter the light transmissive plate 30, nor the light inside the light transmissive plate 30 can pass through the second shading member 50 and exit to the outside of the electronic device 100. Since the second shading member 50 provides a blocking effect, a user cannot see a structure on an inner side of the light transmissive plate 30 with naked eyes through the second shading member 50 from the outer side of the electronic device 100. Therefore, the electronic device 100 looks more aesthetically pleasant.

A difference between a visible light transmittance of the first shading member 60 and a visible light transmittance of the second shading member 50 is between 0 and 15%. The second shading member 50 is black or nearly black when viewed by naked eyes. When the difference between the visible light transmittance of the first shading member 60 and the visible light transmittance of the second shading member 50 is greater than 0 and less than or equal to 15%, colors of the first shading member 60 and the second shading member 50 are the same or similar. That is to say, the first shading member 60 is black or nearly black. In this embodiment, the first shading member 60 and the second shading member 50 are both black or nearly black when viewed by naked eyes, thereby ensuring consistency of an appearance of the electronic device 100. The expression "colors are the same" herein means that a color difference between the first shading member 60 and the second shading member 50 cannot be discerned by naked eyes. The expression "colors are similar" means that the first shading member 60 and the second shading member 50 are slightly different in color when viewed by naked eyes, but the difference can be ignored.

In this embodiment, since the first shading member 60 and the second shading member 50 are the same or similar in color when viewed by naked eyes, the consistency of the appearance of the electronic device 100 is ensured, and the electronic device 100 looks more aesthetically pleasant. In addition, the light emitted by the second functional device 41 can pass through the first shading member 60, thereby ensuring that the second functional device 41 can perform the optical functions thereof.

In an implementation, the second functional device 41 is an infrared light device, and the second functional device 41 can emit infrared light to the outside of the electronic device 100, to assist the camera of the electronic device 100 in imaging during photographing, thereby improving a photographing effect. The first shading member 60 is manufactured with infrared transmissive ink. Since the infrared transmissive ink can transmit infrared light, infrared light emitted by the second functional device 41 which is an infrared light device can pass through the first shading member 60 and the light transmissive plate 30 to exit to the outside of the electronic device 100. In this way, the infrared light device can perform optical functions thereof. Moreover, since the infrared transmissive ink can absorb visible light, the first shading member 60 is black when viewed by naked eyes, and therefore a user cannot see the structure of the electronic device 100 located on the inner side of the light transmissive plate 30 through the first shading member 60 from the outer side of the electronic device 100. Therefore, the electronic device 100 looks more aesthetically pleasant.

In this embodiment, the first shading member 60 is manufactured with infrared transmissive ink, so that the first shading member 60 and the second shading member 50 are both black in appearance. In this way, the electronic device 100 looks more aesthetically pleasant, and the consistency of the appearance of the electronic device 100 is ensured. In addition, the infrared light emitted by the infrared light device can also exit to the outside of the housing 10 through the first shading member 60, thereby ensuring that the infrared light device can perform the optical functions thereof.

In another implementation, the second functional device 41 is a proximity light device, and the proximity light device includes a light emitting member and a light receiving member. The light emitting member is configured to emit light, and the light receiving member is configured to receive light. The proximity light device determines a distance from an external object and a working status of the electronic device 100 by calculating moments at which the light emitting member emits light and the light receiving member receives a light signal. For example, when the distance between the external object and the electronic device 100 is less than a preset distance, the display 20 is turned off. When the distance between the object and the electronic device 100 is greater than the preset distance, the display 20 is turned on. It should be noted that the proximity light device can perform optical functions thereof under the action of only a small amount of light.

The first shading member 60 is a nearly-black ink layer. The nearly-black ink is ink that can transmit a small amount of light and is nearly black when viewed by naked eyes. A transmittance of the nearly-black ink layer is greater than 0 and less than or equal to 15%. It should be noted that the "transmittance of the nearly-black ink layer" herein is a transmittance of light having a wavelength of 550 nm through the nearly-black ink layer. In this embodiment, the transmittance of the nearly-black ink layer is 2%. In other embodiments, the transmittance of the nearly-black ink layer may be slightly less than 2% or greater than 2% and less than or equal to 15%, as long as the transmittance of the nearly-black ink layer can allow the proximity light device to perform optical functions thereof. The light emitted by the light emitting member can exit to the outside of the electronic device 100 through the first shading member 60 and the light transmissive plate 30, and the light exiting to the outside of the housing 10 can enter the receiving space 1 through the first shading member 60 after being reflected and be received by the light receiving member, thereby ensuring that the proximity light device can perform the optical functions thereof. In addition, since the first shading member 60 is black or nearly black when viewed by naked eyes, a user cannot see the structure inside the electronic device 100 through the first shading member 60 from the outer side of the electronic device 100. Therefore, the electronic device 100 looks more aesthetically pleasant. The expression "nearly black" herein means a slight color difference with black which cannot be discerned by naked eyes.

In this embodiment, the first shading member 60 which is a nearly-black ink layer has a same color as the second shading member 50 in appearance. Therefore, the consistency of the appearance of the electronic device 100 is ensured, and the electronic device 100 looks more aesthetically pleasant. In addition, the light emitted by the proximity light device can exit to the outside of the housing 10 through the first shading member 60, and the light exiting to the outside of the housing 10 can enter the housing 10 through the first shading member 60 after being reflected and be received by the proximity light device, thereby ensuring that the proximity light device can perform the optical functions thereof.

In a third implementation, the second functional device 41 is a proximity light device, and the proximity light device includes a light emitting member and a light receiving member. The first shading member 60 and the second shading member 50 are nearly-black ink layers. The nearly-black ink layer is ink that can transmit a small amount of light and is nearly black when viewed by naked eyes. A transmittance of the nearly-black ink layer is greater than 0 and less than or equal to 15%. It should be noted that the "transmittance of the nearly-black ink layer" herein is a transmittance of light having a wavelength of 550 nm through the nearly-black ink layer. The transmittance of the nearly-black ink layer is 2%. In other embodiments, the transmittance of the nearly-black ink layer may be slightly less than 2% or greater than 2%, as long as the transmittance of the nearly-black ink layer can allow the proximity light device to perform optical functions thereof. The light signal emitted by the light emitting member can exit to the outside of the electronic device 100 through the first shading member 60 and the light transmissive plate 30, and the light exiting to the outside of the housing 10 can be received by the light receiving member through the first shading member 60 after being reflected, thereby ensuring that the proximity light device can perform the optical functions thereof.

In this embodiment, the first shading member 60 and the second shading member 50 are nearly-black ink layers. Therefore, a structure and a manufacturing process of the electronic device 100 can be simplified. In addition, since the colors of the first shading member 60 and the second shading member 50 are the same, the consistency of the appearance of the electronic device 100 is ensured, and the optical functions of the proximity light device can be realized.

Referring to FIG. 3, the electronic device 100 further includes a lampshade 44. The lampshade 44 is arranged between the second functional device 41 and the first shading member 60, and a projection of the lampshade 44 on the first inner surface 301 covers a projection of the first shading member 60 on the first inner surface 301. The lampshade 44 is connected to the second shading member 50. In this embodiment, the lampshade 44 is adhered to a surface of the second shading member 50 facing away from the light transmissive plate 30. In other embodiments, the lampshade 44 may be fixedly connected to the second shading member 50 by welding. Specifically, the lampshade 44 is a lens. The lampshade 44 provides a light converging effect, so that the light emitted by the second functional device 41 can be converged to the first shading member 60 and emitted through the first shading member 60 and the light transmissive plate 30. Therefore, light emitted by the second functional device 41 to the second shading member 50 is reduced, and an amount of light of the second functional device 41 exiting through the first shading member 60 is increased. In addition, the lampshade 44 can improve uniformity of the light emitted by the second functional device 41, so that the light emitted by the second functional device 41 can uniformly exit to the outside of the light transmissive plate 30.

The light transmissive portion 2 further includes a decorative member 42 located inside the housing 10. Specifically, the decorative member 42 may be a metal member or a plastic member. The decorative member 42 is connected to the light transmissive plate 30 to fix the light transmissive plate 30. In this embodiment, a first adhesive member 43 is arranged between the second shading member 50 and the decorative member 42, and the first adhesive member 43 is fixedly connected between the second shading member 50 and the decorative member 42, so that the light transmissive plate 30 is fixedly connected to the decorative member 42.

The first adhesive member 43 surrounds an edge of the second shading member 50 and is fixedly connected to the decorative member 42, so that the light transmissive plate 30 is connected to the decorative member 42 in a sealed manner, thereby achieving dust prevention. In this implementation, the first adhesive member 43 is a waterproof adhesive, to achieve a waterproof function, thereby increasing reliability of the connection between the second shading member 50 and the decorative member 42. In other implementations, the second shading member 50 may be fixedly connected to the decorative member 42 by welding, so that the light transmissive plate 30 is fixedly connected to the decorative member 42.

Figure 5:
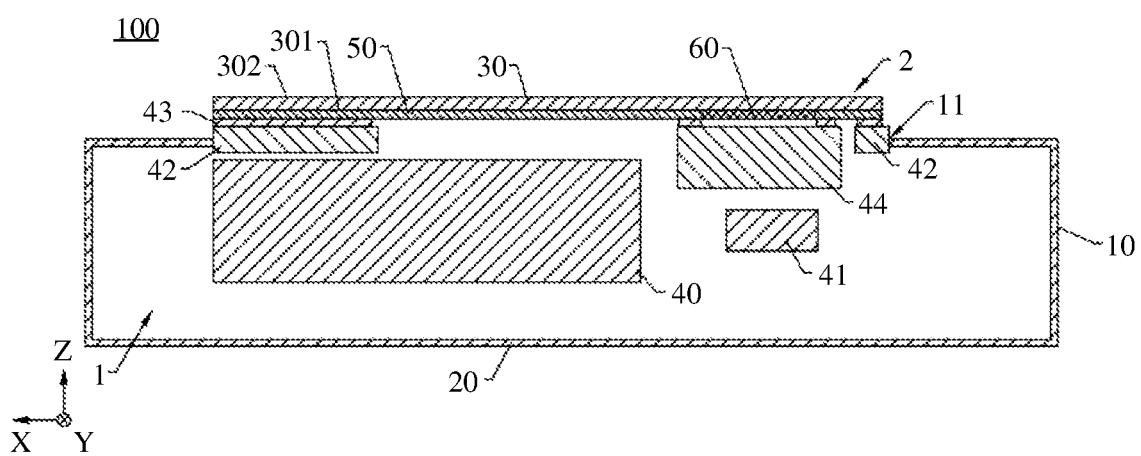
FIG. 5 is a schematic structural cross-sectional view of an electronic device according to a second embodiment of this application.

Referring to FIG. 5, FIG. 5 is a schematic structural cross-sectional view of an electronic device 100 according to a second embodiment of this application. In this embodiment, the decorative member 42 is mounted in the mounting hole 11, and a periphery of the decorative member 42 is connected to a hole wall of the mounting hole 11, so as to be connected to the housing 10. The decorative member 42 protrudes from the housing 10. That is to say, the decorative member plate 42 protrudes from the housing 10 in the direction Z. Certainly, in other embodiments, the decorative member 42 may be flush with the housing 10. The decorative member 42 provides a decorative effect, so that the electronic device 100 looks more aesthetically pleasant. In addition, the decorative member 42 has a certain strength, and therefore can carry the first shading member 60, the second shading member 50, and the light transmissive plate 30.

Figure 6:
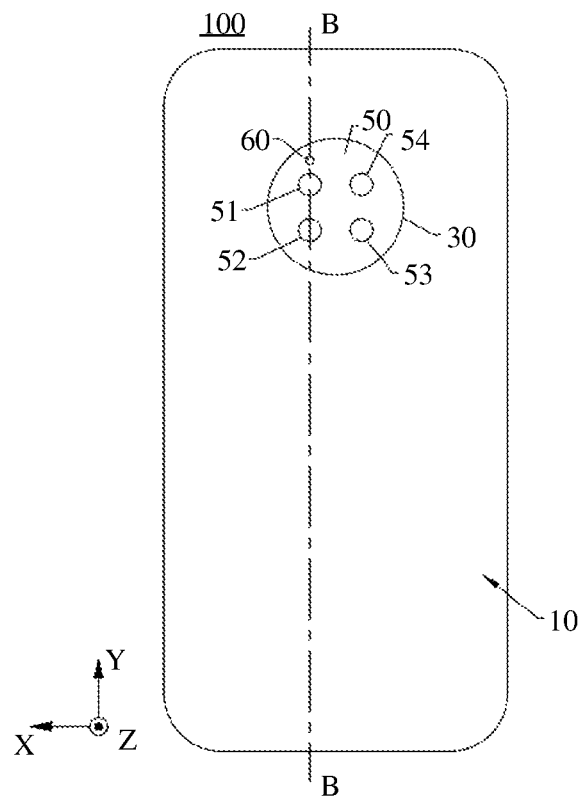
FIG. 6 is a schematic structural diagram of an electronic device according to a third embodiment of this application.
Figure 7:
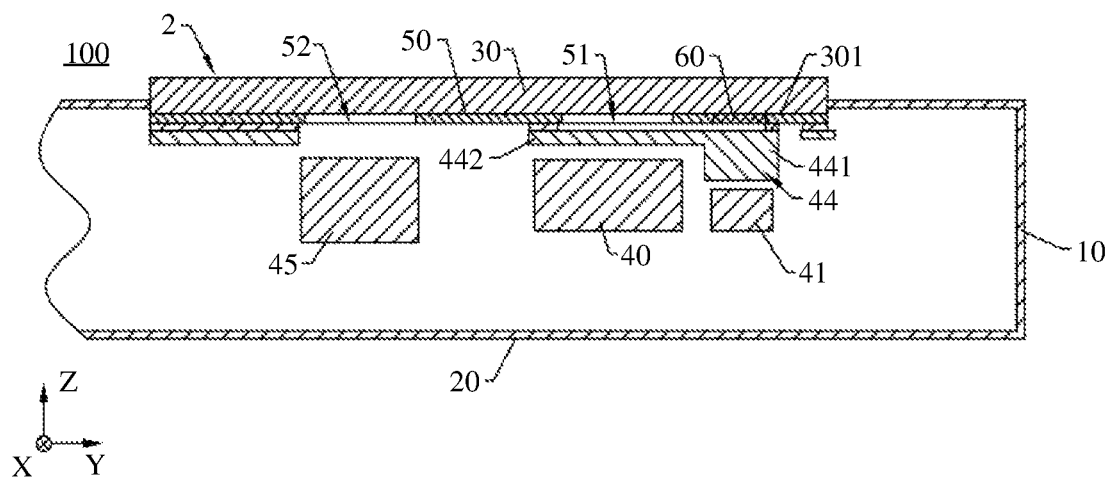
FIG. 7 is a partial schematic cross-sectional view of the electronic device shown in FIG. 6 cut along B-B.

Referring to FIG. 6 and FIG. 7, FIG. 6 is a schematic structural diagram of an electronic device 100 according to a third embodiment of this application, and FIG. 7 is a partial schematic cross-sectional view of the electronic device 100 shown in FIG. 6 cut along B-B.

In this embodiment, the electronic device 100 includes an auxiliary component 45 arranged in the receiving space 1. In this embodiment, the auxiliary component 45 is a camera module, and three camera modules are arranged.

A second hole 52, a third hole 53, and a fourth hole 54 are provided on the second shading member 50. The second hole 52 and the third hole 53 are symmetrical along a central axis of the second shading member 50 in the direction Y, and the third hole 53 and the fourth hole 54 are symmetrical along a central axis of the second shading member 50 in the direction X. The first camera module is arranged opposite to the second hole 52, and a lens surface of the first camera module faces the second hole 52. The second camera module is arranged opposite to the third hole 53, and a lens surface of the second camera module faces the third hole 53. The third camera module is arranged opposite to the fourth hole 54, and a lens surface of the third camera module faces the fourth hole 54.

A first hole 51 is further provided on the second shading member 50. The first hole 51 and the second hole 52 are symmetrical along the central axis of the second shading member 50 in the direction X, and the first hole 51 and the fourth hole 54 are symmetrical along the central axis of the second shading member 50 in the direction Y. That is to say, the first hole 51, the second hole 52, the third hole 53, and the fourth hole 54 are respectively located at four corners of a square. The first functional device 40 is arranged opposite to the first hole 51. In this embodiment, since the first hole 51 is provided, and the first hole 51 and the second hole 52 and the third hole 53 and the fourth hole 54 respectively form a symmetrical structure, the electronic device 100 looks more aesthetically pleasant and symmetrical.

The second functional device 41 is located in the receiving space 1, and is arranged side by side with the auxiliary component 45 and the first functional device 40. In this embodiment, the second functional device 41, the first functional device 40, and the first camera module are arranged side by side and spaced apart along the direction Y, and the second functional device 41 is located on a side of the first functional device 40 away from the first camera module. In other embodiments, the position of the second functional device 41 may be adjusted according to the spatial layout in the receiving space 1.

The first shading member 60 is arranged opposite to the second functional device 41. In this embodiment, the first shading member 60 and the first hole 51 are spaced apart along the direction Y, and the first shading member 60 is located on a side of the first hole 51 facing away from the second hole 52. The first shading member 60 is configured to block visible light. The first shading member 60 is further configured to transmit the light emitted by the second functional device 41, or transmit the preset light. In other embodiments, the first shading member 60 is configured to transmit the light emitted by the second functional device 41, and transmit the preset light outside the housing 10. The first shading member 60 and the second shading member 50 are the same or similar in color when viewed by naked eyes. The expression "colors are the same" herein means that a color difference between the first shading member 60 and the second shading member 50 cannot be discerned by naked eyes. The expression "colors are similar" means that the first shading member 60 and the second shading member 50 are slightly different in color.

In this embodiment, since the first shading member 60 and the second shading member 50 are the same or similar in color when viewed by naked eyes, the consistency of the appearance of the electronic device 100 is ensured. In addition, the light emitted by the second functional device 41 can pass through the first shading member 60, thereby ensuring that the second functional device 41 can perform the optical functions thereof.

As shown in FIG. 7, in this embodiment, the lampshade 44 includes a lampshade body 441 and an extension 442. The lampshade body 441 and the extension 442 are fixedly connected to each other. The lampshade 44 is fixedly connected to the second shading member 50. The lampshade 44 is adhered to the surface of the second shading member 50 facing away from the light transmissive plate 30. In other embodiments, the lampshade 44 may be fixedly connected to the second shading member 50 by welding. The lampshade body 441 is located between the second functional device 41 and the first shading member 60, and a projection of the lampshade body 441 on the first inner surface 301 covers the projection of the first shading member 60 on the first inner surface 301. The lampshade body 441 provides a light converging effect, so that the light emitted by the second functional device 41 can be converged to the first shading member 60 and emitted through the first shading member 60 and the light transmissive plate 30. Therefore, light emitted by the second functional device 41 to the second shading member 50 is reduced, and an amount of light of the second functional device 41 exiting through the first shading member 60 is increased. In addition, the lampshade body 441 can improve uniformity of the light emitted by the second functional device 41, so that the light emitted by the second functional device 41 can uniformly exit to the outside of the light transmissive plate 30.

The extension 442 of the lampshade 44 is located between the first functional device 40 and the first hole 51, and covers the first hole 51. The extension 442 provides a blocking effect, so that a user can see an appearance of the extension 442 from an outer side of the light transmissive plate 30 through the first hole 51 but cannot see a structure of the first functional device 40. Therefore, the electronic device 100 looks more aesthetically pleasant.

Figure 8:
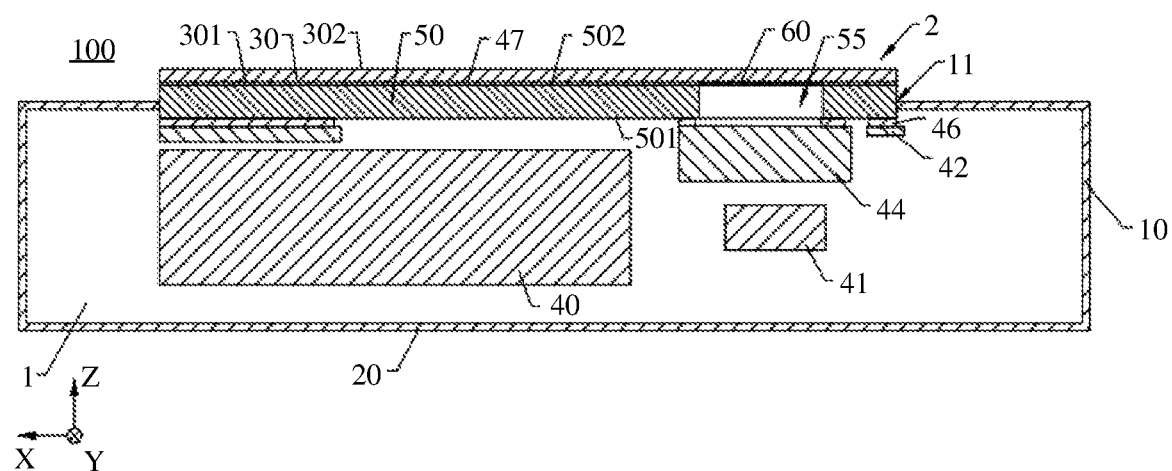
FIG. 8 is a schematic structural cross-sectional view of an electronic device according to a fourth embodiment of this application.

Referring to FIG. 8, FIG. 8 is a schematic structural cross-sectional view of an electronic device 100 according to a fourth embodiment of this application.

In this embodiment, the second shading member 50 is a black plastic member. The second shading member 50 is mounted in the mounting hole 11, and a periphery of the second shading member 50 is connected to the hole wall of the mounting hole 11, so as to be connected to the housing 10. A shape and a size of the second shading member 50 are the same as those of the mounting hole 11. In this embodiment, the mounting hole 11 and the second shading member 50 are both circular. In other embodiments, the light transmissive plate 30 and the mounting hole 11 may be rectangular, square, or hexagonal. The shapes and the sizes of the mounting hole 11 and the second shading member 50 may alternatively be adjusted according to an actual situation.

The second shading member 50 protrudes from the housing 10. That is to say, the second shading member 50 protrudes from the housing 10 in the direction Z. Certainly, in other embodiments, the second shading member 50 may be flush with the housing 10.

The second shading member 50 includes a second inner surface 501 and a second outer surface 502. The second inner surface 501 and the second outer surface 502 are arranged opposite to each other, and the second inner surface 501 is located inside the housing 10. A hollowed-out area 55 is arranged on the second shading member 50. The hollowed-out area 55 runs through the second inner surface 501 and the second outer surface 502 of the second shading member 50.

The first functional device 40 and the second functional device 41 are both arranged opposite to the second shading member 50. The first functional device 40 and the second functional device 41 are arranged side by side along the direction X. In other embodiments, the first functional device 40 and the second functional device 41 may be arranged side by side along the direction Y. A specific position of the second functional device 41 may be adjusted according to a spatial layout in the receiving space 1. By arranging the second functional device 41 and the first functional device 40 side by side along the direction X, an occupied space is reduced. Therefore, a size of the electronic device 100 in the direction Z is reduced, that is, a thickness of the electronic device 100 is reduced, thereby facilitating thinning of the electronic device 100.

The second functional device 41 and the hollowed-out area 55 are arranged opposite to each other in the direction Z, and the light emitted by the second functional device 41 can pass through the hollowed-out area 55 to exit to the outside of the electronic device 100. The first functional device 40 and the part of the second shading member 50 having no hollowed-out area 55 arranged thereon are arranged opposite to each other, and the second shading member 50 can block light, so that the first functional device 40 is invisible from the outer side of the electronic device 100.

The electronic device 100 further includes a decorative member 42 located inside the housing 10. Specifically, the decorative member 42 may be a metal member or a plastic member. The decorative member 42 is connected to the second shading member 50. In this embodiment, a second adhesive member 46 is arranged between the second shading member 50 and the decorative member 42, and the second adhesive member 46 is fixedly connected between the second shading member 50 and the decorative member 42, so that the decorative member 42 is fixedly connected to the second shading member 50.

The second adhesive member 46 surrounds the edge of the second shading member 50 and is fixedly connected to the decorative member 42, so that the second shading member 50 is connected to the decorative member 42 in a sealed manner, thereby achieving dust prevention. In an implementation, the second adhesive member 46 is a waterproof adhesive, to achieve a waterproof function, thereby increasing reliability of the connection between the second shading member 50 and the decorative member 42. In other embodiments, the second shading member 50 may be fixedly connected to the decorative member 42 by welding.

The light transmissive portion 2 includes the light transmissive plate 30. The light transmissive plate 30 is a transparent glass plate. In other embodiments, the light transmissive plate 30 may be made of other transparent materials, such as an acrylic material. The light transmissive plate 30 includes a first inner surface 301 and a first outer surface 302. The first inner surface 301 and the second outer surface 502 are arranged opposite to each other. The light transmissive plate 30 and the second shading member 50 are arranged in a stacked manner, and the light transmissive plate 30 covers the second shading member 50. The first inner surface 301 of the light transmissive plate 30 is connected to the second outer surface 502 of the second shading member 50.

The light transmissive portion 2 further includes the first shading member 60. The first shading member 60 is manufactured with ink. The first shading member 60 is coated on the first inner surface 301 of the light transmissive plate 30, and completely covers the hollowed-out area 55. The first shading member 60 may be partially located in the hollowed-out area 55, or an orthographic projection of the first shading member 60 in the direction Z coincides with the hollowed-out area 55. Specifically, the first shading member 60 may exactly cover the hollowed-out area 55, or may be slightly larger than the hollowed-out area 55. The first shading member 60 is configured to block visible light and transmit the light emitted by the second functional device 41, or transmit the preset light. In other embodiments, the first shading member 60 is configured to transmit the light emitted by the second functional device 41, and transmit the preset light outside the housing 10. That is to say, the light emitted by the second functional device 41 can pass through the first shading member 60 and the light transmissive plate 30 to exit to the outside of the electronic device 100. The external preset light can further pass through the light transmissive plate 30 and the first shading member 60 to enter the second functional device 41.

The first shading member 60 and the second shading member 50 are both black or nearly block when viewed by naked eyes. Certainly, the first shading member 60 and the second shading member 50 may be slightly different in color. It should be noted that a thickness of the first shading member 60 manufactured with ink in the direction Z is very small. That is to say, a height difference between the first shading member 60 and the second outer surface 502 of and the second shading member 50 cannot be discerned by naked eyes.

In this embodiment, since the first shading member 60 and the second shading member 50 are the same or similar in color when viewed by naked eyes, the consistency of the appearance of the electronic device 100 is ensured. In addition, the light emitted by the second functional device 41 can pass through the first shading member 60, thereby ensuring that the second functional device 41 can normally achieve optical performance thereof.

In an implementation, the second functional device 41 is an infrared light device, and the first shading member 60 is manufactured with infrared transmissive ink. The infrared transmissive ink can transmit infrared light. The infrared light emitted by the infrared light device successively passes through the hollowed-out area 55, the first shading member 60, and the light transmissive plate 30 to exit to the outside of the electronic device 100. In this way, the infrared light device can perform optical functions thereof. Moreover, since the infrared transmissive ink can absorb visible light, the first shading member 60 is black when viewed by naked eyes, and therefore a user cannot see the structure of the electronic device 100 located on the inner side of the second shading member 50 through the first shading member 60 from the outer side of the electronic device 100. Therefore, the electronic device 100 looks more aesthetically pleasant.

In this embodiment, the second shading member 50 manufactured with black plastic and the first shading member 60 manufactured with infrared transmissive ink are both black in appearance. In this way, the electronic device 100 looks more aesthetically pleasant, and the consistency of the appearance of the electronic device 100 is ensured. In addition, the infrared light emitted by the infrared light device can also exit to the outside of the housing 10 through the first shading member 60, thereby ensuring that the infrared light device can perform the optical functions thereof.

In another implementation, the second functional device 41 is a proximity light device, and the proximity light device includes a light emitting member and a light receiving member. The first shading member 60 is a nearly-black ink layer. The nearly-black ink is ink that can transmit a small amount of light. A transmittance of the nearly-black ink layer is greater than 0 and less than or equal to 15%. In this embodiment, the transmittance of the nearly-black ink layer is 2%. In other embodiments, the transmittance of the nearly-black ink layer may be slightly less than 2% or greater than 2%, as long as the transmittance of the nearly-black ink layer can allow the proximity light device to perform optical functions thereof. The light emitted by the light emitting member can exit to the outside of the electronic device 100 through the hollowed-out area 55, the first shading member 60, and the light transmissive plate 30, and the light exiting to the outside of the housing 10 can enter the receiving space 1 through the first shading member 60 and the hollowed-out area 55 after being reflected and be received by the light receiving member, thereby ensuring that the proximity light device can perform the optical functions thereof. In addition, since the first shading member 60 is black or nearly black when viewed by naked eyes, a user cannot see the structure inside the electronic device 100 through the first shading member 60 from the outer side of the electronic device 100. Therefore, the electronic device 100 looks more aesthetically pleasant. The expression "nearly black" herein means a slight color difference with black which cannot be discerned by naked eyes.

In this embodiment, the second shading member 50 manufactured with black plastic has a same color as the first shading member 60 manufactured with the nearly-black ink in appearance. In this way, the electronic device 100 looks more aesthetically pleasant, and the consistency of the appearance of the electronic device 100 is ensured. In addition, the light emitted by the proximity light device can exit to the outside of the housing 10 through the first shading member 60, and the light exiting to the outside of the housing 10 can enter the housing 10 through the first shading member 60 after being reflected and be received by the proximity light device, thereby ensuring that the proximity light device can normally perform the optical functions thereof.

As shown in FIG. 8, the electronic device 100 further includes an adhesive layer 47, and the adhesive layer 47 is adhered between the first inner surface 301 and the second outer surface 502, so that the light transmissive plate 30 is fixedly connected to the second shading member 50. The adhesive layer 47 is transparent, to prevent the adhesive layer 47 from affecting the transmittance of the light transmissive plate 30. Specifically, the adhesive layer 47 is located in an area of the first inner surface 301 having no first shading member 60 coated thereon, and a thickness of the adhesive layer 47 in the direction Z is the same as that of the first shading member 60. Therefore, the first inner surface 301 of the light transmissive plate 30 is parallel to the second outer surface 502 of the second shading member 50. In this way, the electronic device 100 looks more consistent and aesthetically pleasant, and the connection between the light transmissive plate 30 and the second shading member 50 is more stable.

The electronic device 100 further includes a lampshade 44. The lampshade 44 is located inside the housing 10, is arranged between the second functional device 41 and the second shading member 50, and covers the hollowed-out area 55. The lampshade 44 is connected to the second shading member 50. In this embodiment, the lampshade 44 is adhered to the second inner surface 501 of the second shading member 50. In other embodiments, the lampshade 44 may be fixedly connected to the second shading member 50 by welding. Specifically, the lampshade 44 is a lens. The lampshade 44 provides a light converging effect, so that the light emitted by the second functional device 41 can be converged to the first shading member 60 and emitted through the first shading member 60 and the light transmissive plate 30. Therefore, light emitted by the second functional device 41 to the second shading member 50 is reduced, and an amount of light of the second functional device 41 exiting through the first shading member 60 is increased. In addition, the lampshade 44 can improve uniformity of the light emitted by the second functional device 41, so that the light emitted by the second functional device 41 can uniformly exit to the outside of the light transmissive plate 30.

Figure 9:
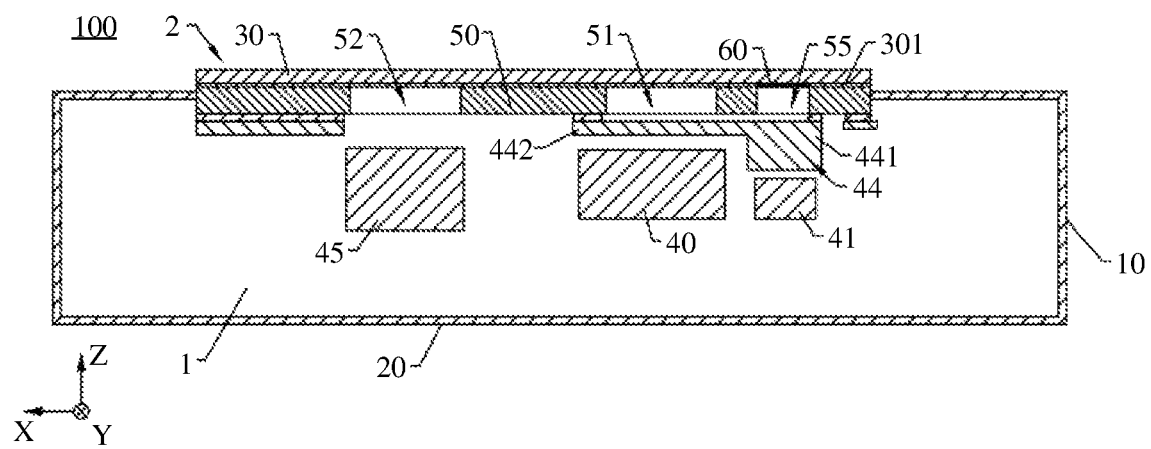
FIG. 9 is a schematic structural cross-sectional view of an electronic device according to a fifth embodiment of this application.

Referring to FIG. 9, FIG. 9 is a schematic structural cross-sectional view of an electronic device 100 according to a fifth embodiment of this application.

The electronic device 100 includes an auxiliary component 45 arranged in the receiving space 1. In this embodiment, the auxiliary component 45 is a camera module, and three camera modules are arranged.

A second hole 52, a third hole, and a fourth hole (not shown) are provided on the second shading member 50. The second hole 52, the third hole, and the fourth hole run through the second shading member 50 in the direction Z. The second hole 52 and the third hole are symmetrical along the central axis of the second shading member 50 in the direction X, and the third hole and the fourth hole are symmetrical along the central axis of the second shading member 50 in the direction Y. The first camera module is arranged opposite to the second hole 52, and a lens surface of the first camera module faces the second hole 52. The second camera module is arranged opposite to the third hole, and a lens surface of the second camera module faces the third hole. The third camera module is arranged opposite to the fourth hole, and a lens surface of the third camera module faces the fourth hole.

A first hole 51 is further provided on the second shading member 50. The first hole 51 runs through the second shading member 50 in the direction Z. The first hole 51 and the second hole 52 are symmetrical along the central axis of the second shading member 50 in the direction Y, and the first hole 51 and the fourth hole are symmetrical along the central axis of the second shading member 50 in the direction X. That is to say, the first hole 51, the second hole 52, the third hole, and the fourth hole are respectively located at four corners of a square. The first functional device 40 is arranged opposite to the first hole 51. In this embodiment, since the first hole 51 is provided, and the first hole 51 and the second hole 52 and the third hole and the fourth hole respectively form a symmetrical structure, the electronic device 100 looks more aesthetically pleasant and symmetrical.

The second functional device 41 is located in the receiving space 1, and is arranged side by side with the auxiliary component 45 and the first functional device 40. In this embodiment, the second functional device 41, the first functional device 40, and the first camera module are arranged side by side and spaced apart along the direction X, and the second functional device 41 is located on a side of the first functional device 40 away from the first camera module. In other embodiments, the position of the second functional device 41 may be adjusted according to the spatial layout in the receiving space 1.

The second functional device 41 is arranged opposite to the hollowed-out area 55 in the direction Z. The first shading member 60 is coated on the first inner surface 301 of the light transmissive plate 30, and completely covers the hollowed-out area 55. Specifically, the first shading member 60 may exactly cover the hollowed-out area 55, or may be slightly larger than the hollowed-out area 55. The first shading member 60 is configured to block visible light and transmit the light emitted by the second functional device 41, or transmit the preset light. In other embodiments, the first shading member 60 is configured to transmit the light emitted by the second functional device 41, and transmit the preset light outside the housing 10. That is to say, the light emitted by the second functional device 41 can pass through the first shading member 60 and the light transmissive plate 30 to exit to the outside of the electronic device 100. The external preset light can further pass through the light transmissive plate 30 and the first shading member 60 to enter the second functional device 41. The first shading member 60 and the second shading member 50 are both black or nearly block when viewed by naked eyes. Certainly, the first shading member 60 and the second shading member 50 may be slightly different in color.

In this embodiment, since the first shading member 60 and the second shading member 50 are the same or similar in color when viewed by naked eyes, the consistency of the appearance of the electronic device 100 is ensured. In addition, the light emitted by the second functional device 41 can pass through the first shading member 60, thereby ensuring that the second functional device 41 can perform the optical functions thereof.

The lampshade 44 includes a lampshade body 441 and an extension 442. The lampshade 44 is fixedly connected to the second shading member 50. In this embodiment, the lampshade 44 is adhered to a surface of the second shading member 50 facing away from the light transmissive plate 30. In other embodiments, the lampshade 44 may be fixedly connected to the second shading member 50 by welding. The lampshade body 441 is located between the second functional device 41 and the first shading member 60, and a projection of the lampshade body 441 on the first inner surface 301 covers the projection of the first shading member 60 on the first inner surface 301. The lampshade body 441 provides a light converging effect, so that the light emitted by the second functional device 41 can be converged to the first shading member 60 and emitted through the first shading member 60 and the light transmissive plate 30. Therefore, light emitted by the second functional device 41 to the second shading member 50 is reduced, and an amount of light of the second functional device 41 exiting through the first shading member 60 is increased. In addition, the lampshade body 441 can improve uniformity of the light emitted by the second functional device 41, so that the light emitted by the second functional device 41 can uniformly exit to the outside of the light transmissive plate 30.

The extension 442 is located between the first functional device 40 and the first hole 51, and covers the first hole 51. The extension 442 provides a blocking effect, so that a user can see an appearance of the extension 442 from an outer side of the light transmissive plate 30 through the hollowed-out area 55 but cannot see a structure of the first functional device 40. Therefore, the electronic device 100 looks more aesthetically pleasant.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
a housing having a mounting hole;
a first functional device located inside the housing;
a second functional device located inside the housing and arranged side by side with the first functional device in a first direction; and
a light transmissive portion mounted in the mounting hole and connected to the housing, wherein the light transmissive portion comprises a light transmissive plate, a first shading member, and a second shading member;
wherein the first shading member is located on an inner surface of the light transmissive plate, the first shading member is arranged opposite to the second functional device in a second direction, and the first shading member is configured to block visible light and transmit preset light; and
wherein the second shading member is located on the inner surface of the light transmissive plate, the second shading member surrounds the first shading member, and the second shading member is configured to block visible light, and the first direction is perpendicular to the second direction.

2. The electronic device of claim 1, wherein the preset light is light emitted by the second functional device.

3. The electronic device of claim 1, wherein the preset light is light entering the second functional device through the first shading member.

4. The electronic device of claim 1, wherein a difference between a visible light transmittance of the first shading member and a visible light transmittance of the second shading member is between 0 and 15%.

5. The electronic device of claim 4, wherein the second shading member is a black shading layer, the first shading member is an ink layer, and the second shading member comprises a hollowed-out area opposite to the second functional device in the second direction, wherein an orthographic projection of the first shading member in the second direction coincides with an orthographic projection of the hollowed-out area in the second direction.

6. The electronic device of claim 5, wherein the black shading layer is a black ink layer, the first shading member and the second shading member are both coated on the inner surface of the light transmissive plate, and the second shading member surrounds the first shading member and is connected to a periphery of the first shading member.

7. The electronic device of claim 5, wherein the black shading layer is a black plastic member, the hollowed-out area runs through the black plastic member, the second shading member is fixed to the inner surface of the light transmissive plate, and the first shading member is formed in the hollowed-out area.

8. The electronic device of claim 5, wherein the black shading layer is a black plastic member, and the hollowed-out area runs through the black plastic member.

9. The electronic device of claim 8, wherein the first shading member is arranged on the inner surface of the light transmissive plate, an adhesive layer is arranged around the inner surface of the first shading member, the second shading member is stacked on the adhesive layer and fixed to the inner surface by the adhesive layer, and the first shading member and the hollowed-out area are arranged opposite to each other in the second direction.

10. The electronic device of claim 5, wherein the second functional device is an infrared light device, and the first shading member is infrared transmissive ink and is configured to transmit infrared light.

11. The electronic device of claim 5, wherein the second functional device is a proximity light device, the first shading member is nearly-black ink, and the first shading member is configured to transmit a part of light emitted by the proximity light device.

12. The electronic device of claim 5, wherein a first hole is provided on the second shading member, and the first hole is opposite to the first functional device in the second direction.

13. The electronic device of claim 12, wherein a second hole is further provided on the second shading member; wherein the first hole, the second hole, and the hollowed-out area are arranged in sequence along the first direction, and the first hole and the second hole are symmetrical along an axis of the second shading member.

14. The electronic device of claim 13, wherein a third hole and a fourth hole are further provided on the second shading member; wherein any two of the first hole, the second hole, the third hole, or the fourth hole are symmetrical with respect to the axis of the second shading member.

15. The electronic device of claim 6, wherein the light transmissive portion comprises a decorative member; wherein the decorative member is connected to a side of the second shading member facing away from the light transmissive plate, located in the mounting hole, and connected to the housing.

16. The electronic device of claim 6, wherein the light transmissive portion comprises a decorative member connected to a side of the second shading member facing away from the light transmissive plate, the light transmissive plate is located in the mounting hole, and a peripheral side surface of the light transmissive plate is connected to the housing.

17. The electronic device of claim 7, wherein the second shading member is located in the mounting hole, and a peripheral side surface of the second shading member is connected to the housing.

18. The electronic device of claim 1, further comprising a lampshade; wherein the lampshade is located inside the housing and between the first shading member and the second functional device, and a projection of the lampshade on the inner surface of the light transmissive plate covers a projection of the first shading member on the inner surface of the light transmissive plate.

19. The electronic device of claim 12, further comprising a lampshade; wherein the lampshade comprises a lampshade body and an extension, the lampshade body is located between the first shading member and the second functional device, a projection of the lampshade on the inner surface of the light transmissive plate covers a projection of the first shading member on the inner surface of the light transmissive plate, the extension is located between the first hole and the first functional device, and the extension covers the first hole.

20. An electronic device, comprising:
   a housing having a mounting hole;
   a first functional device located inside the housing;
   a second functional device located inside the housing; and
   a light transmissive portion mounted in the mounting hole and connected to the housing, wherein the light transmissive portion comprises a light transmissive plate, a first shading member, and a second shading member;
   wherein the first shading member is located on an inner surface of the light transmissive plate, the first shading member is arranged opposite to the second functional device in a thickness direction of the electronic device, and the first shading member is configured to block visible light and transmit preset light; and
   wherein the second shading member is located on the inner surface of the light transmissive plate, the second shading member surrounds the first shading member, and the second shading member is configured to block visible light.

* * * * *